(12) United States Patent
Yamashita

(10) Patent No.: US 10,474,329 B2  
(45) Date of Patent: Nov. 12, 2019

(54) SELECTIVE GENERATION AND DISPLAY OF INTERFACES OF A WEBSITE OR PROGRAM

(71) Applicant: Capital One Services, LLC, McLean, VA (US)

(72) Inventor: Mark Yamashita, Toronto (CA)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/948,520

(22) Filed: Apr. 9, 2018

(65) Prior Publication Data

US 2019/0310743 A1    Oct. 10, 2019

(51) Int. Cl.
| | |
|---|---|
| G06F 3/0482 | (2013.01) |
| H04L 29/08 | (2006.01) |
| G06N 20/00 | (2019.01) |
| G06F 21/31 | (2013.01) |

(52) U.S. Cl.
CPC ........... *G06F 3/0482* (2013.01); *G06N 20/00* (2019.01); *G06F 21/31* (2013.01); *H04L 67/22* (2013.01); *H04L 67/306* (2013.01)

(58) Field of Classification Search
CPC ....... H04L 67/22; H04L 67/306; H04L 63/08; G06F 3/0481; G06F 3/0482; G06N 20/00
See application file for complete search history.

(56) References Cited

U.S. PATENT DOCUMENTS

| | | | |
|---|---|---|---|
| 5,115,501 A | | 6/1992 | Kerr |
| 6,400,996 B1* | | 6/2002 | Hoffberg ............ G05B 19/0426 370/218 |
| 7,899,750 B1* | | 3/2011 | Klieman ............... G06Q 20/102 705/35 |
| 2002/0124075 A1* | | 9/2002 | Venkatesan ............. H04L 29/06 709/224 |
| 2004/0216036 A1* | | 10/2004 | Chu .................. G06F 17/30899 715/202 |
| 2005/0054381 A1 | | 3/2005 | Lee et al. |

(Continued)

OTHER PUBLICATIONS

Mario Filho, "Using Machine Learning To Predict Which User Will Click An Ad", http://mariofilho.com/using-machine-learning-predict-user-will-click-ad/, Feb. 14, 2017, 10 pages.

(Continued)

*Primary Examiner* — Amy Ng  
*Assistant Examiner* — William Wong  
(74) *Attorney, Agent, or Firm* — Harrity & Harrity, LLP

(57) ABSTRACT

A user device may provide, for display in a first area of a graphical user interface (GUI), a first link to a first predicted interface within a website or a program. The first predicted interface may be an interface to which a user is predicted to navigate. The first link may be a graphical representation of at least a portion of the first predicted interface. The user device may provide, for display in a second area of the GUI, additional links to additional predicted interfaces within the website or the program. The first link may be more prominently displayed in relation to the additional links. The additional predicted interfaces may be interfaces to which the user is predicted to navigate. The additional links may be graphical representations of at least a portion of the additional predicted interfaces.

20 Claims, 7 Drawing Sheets

(56) References Cited

U.S. PATENT DOCUMENTS

| | | |
|---|---|---|
| 2006/0247915 A1 | 11/2006 | Bradford et al. |
| 2010/0083217 A1* | 4/2010 | Dalal .................... G06F 3/0482 717/106 |
| 2013/0238783 A1* | 9/2013 | Alexander ........ G06F 17/30873 709/224 |
| 2018/0114139 A1* | 4/2018 | Kucera .................. H04L 67/22 |
| 2018/0165590 A1* | 6/2018 | Vlassis ................. G06N 7/005 |
| 2018/0239500 A1* | 8/2018 | Allen .................... G06F 3/0482 |

OTHER PUBLICATIONS

J.A Adeyiga et al., "A Neural Network Based Model for Detecting Irregularities in e-Banking Transactions", https://www.researchgate.net/profile/Adebayo_Omotosho/publication/280113114_A_Neural_Network_Based_Model_for_Detecting_Irregularities_in_e-Banking_Transactions/links/55ad351b08aed614b097a572/A-Neural-Network-Based-Model-for-Detecting-Irregularities-in-e-Banking-Transactions.pdf, Dec. 2011, 9 pages.

\* cited by examiner

SELECTIVE GENERATION AND DISPLAY OF INTERFACES OF A WEBSITE OR PROGRAM

BACKGROUND

A display of a user device may display a user interface (e.g., a graphical user interface). A user interface may permit interactions between a user of the user device and the user device. In some cases, the user may interact with the user interface to operate and/or control the user device to produce a desired result. For example, the user may interact with the user interface of the user device to cause the user device to perform an action. Additionally, the user interface may provide information to the user.

SUMMARY

According to some possible implementations, a user device may include one or more memories and one or more processors that are communicatively coupled to the one or more processors. The one or more processors may provide, for display in a first area of a graphical user interface (GUI), a first link to a first predicted interface within a program or website. The first predicted interface may be an interface to which a user is predicted to navigate. The first link may be a graphical representation of at least a portion of the first predicted interface. The one or more processors may provide, for display in a second area of the GUI, one or more additional links to one or more additional predicted interfaces within the program or the website. The first link may be more prominently displayed in relation to the one or more additional links. The one or more additional predicted interfaces may be interfaces to which the user is predicted to navigate. The one or more additional links may be graphical representations of at least a portion of the one or more additional predicted interfaces.

According to some possible implementations, a device may include one or more memories and one or more processors that are communicatively coupled to the one or more processors. The one or more processors may receive a data model that has been trained on historical information associated with a group of users that have accessed a website or program. The website or the program may include a set of interfaces. The historical information may include historical interactions information indicating historical user interactions with the set of interfaces of the website or the program and historical user account information associated with the group of users. The data model may be used after an authentication procedure associated with the website or the program. The one or more processors may receive, from a user device, an authentication request that includes authentication information for a user account. The one or more processors may validate the authentication request using the authentication information. The one or more processors may predict, using the data model, a sequence of interfaces to which the user device will navigate after being authenticated. The one or more processors may generate, based on the sequence of interfaces predicted by the data model, an interface of the website or the program that includes one or more links to one or more predicted interfaces, of the sequence of interfaces to which the user device is predicted to navigate. The one or more processors may provide the interface that includes the one or more links for display on the user device.

According to some possible implementations, a method may include receiving, by a device, a data model that has been trained on historical information associated with a group of users that have accessed a website or a program. The website or the program may include a set of interfaces. The historical information may include historical interactions information indicating historical user interactions with the set of interfaces of the website or the program and historical user account information associated with the group of users. The method may include predicting, by the device and by using the data model, a sequence of interfaces to which a user device will navigate after being authenticated. The sequence of interfaces may be based on a particular time period that the user device is to access the website or the program. The method may include generating, by the device and based on the sequence of interfaces predicted by the data model, an interface of the website or the program that includes one or more links to one or more predicted interfaces, of the sequence of interfaces to which the user device is predicted to navigate. The method may include receiving, by the device and from the user device, an authentication request that includes authentication information for a user account. The method may include validating, by the device, the authentication request using the authentication information. The method may include selecting, by the device, the interface that includes the one or more links to the one or more predicted interfaces, based on a time at which the authentication request is received matching with the particular time period that was used to predict the sequence of interfaces. The method may include providing, by the device and for display on the user device, the interface that includes the one or more links.

DETAILED DESCRIPTION

Figure 1A:
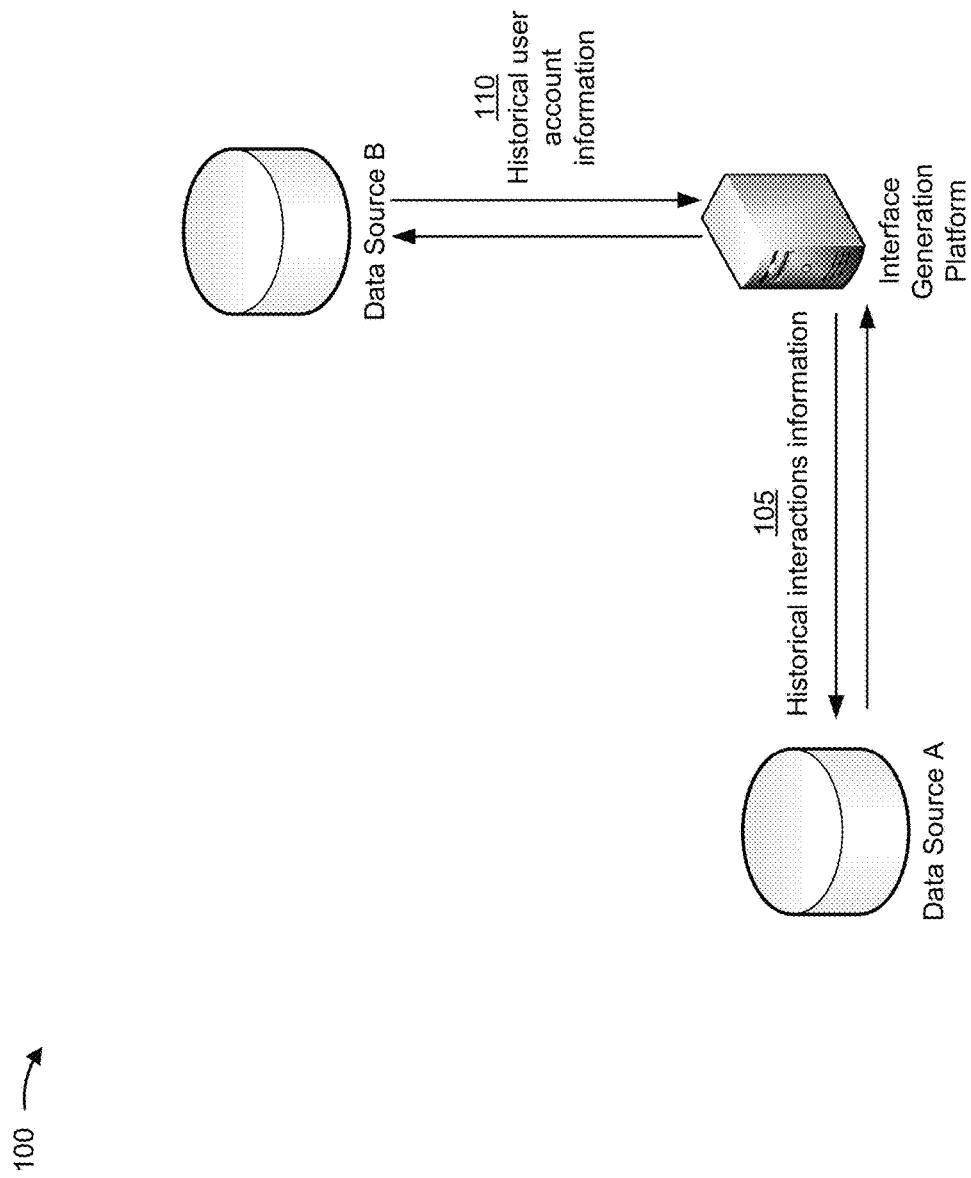
FIGS. 1A-1D are diagrams of an overview of an example implementation described herein.

The following detailed description of example implementations refers to the accompanying drawings. The same reference numbers in different drawings may identify the same or similar elements.

A computer program (referred to herein as a program) or a website may provide a number of different services that may be made available to a user through a set of interfaces (e.g., a web interface, an interface displayed on a user device, etc.). Additionally, some websites or programs may include an authentication procedure that requires that a user device provide login credentials (e.g., a username, a password, etc.) to access services provided by the websites or programs.

However, if a website or a program provides a number of different services through a set of interfaces, a user may have to consistently maneuver through the set of interfaces to load a desired interface. For example, a user may interact with a login interface that is displayed on a user device to input login credentials for a website, which may cause the user device to display a primary interface of the website (e.g., a homepage). In this case, the user may interact with the primary interface to maneuver from the primary interface to a number of intermediary interfaces (e.g., different webpages of the website) before finally reaching a desired interface (e.g., a desired webpage). This is an inefficient use of resources (e.g., processing resources, network resources, etc.) because resources are used to load interfaces that the user is not interested in viewing (e.g., the homepage, the intermediary webpages, etc.). Additionally, this provides a poor user experience by making the user wait longer to reach the desired webpage.

Some implementations described herein allow a user device to provide, for display on a user interface of the user device, one or more links to one or more predicted interfaces within a website or a program. For example, the user device may provide, for display in a first area of a graphical user interface (GUI), a first link to a first predicted interface within the website or the program. The first predicted interface may be an interface to which a user is predicted to navigate, and the first link may be a graphical representation of at least a portion of the first predicted interface. Additionally, the user device may provide, for display in a second area of the GUI, one or more additional links to one or more additional predicted interfaces within the website or the program. The one or more additional predicted interfaces may be interfaces to which the user is predicted to navigate after navigating to the first predicted interface, and the one or more additional links may be graphical representations of at least a portion of the one or more additional predicted interfaces.

Additionally, or alternatively, some implementations described herein provide an interface generation platform for using machine learning to selectively generate and provide interfaces of a website or a program for display on a user device. For example, the interface generation platform may receive a data model (e.g., a machine learning model) that has been trained on historical information associated with a group of users that have accessed a website or a program. The historical information may include historical interactions information indicating historical user interactions with a set of interfaces of the website or the program and historical user account information associated with the group of users.

Additionally, the interface generation platform may receive, from a user device, an authentication request that includes authentication information for a user account. This may cause the interface generation platform to validate the authentication request and to use the data model to predict a sequence of interfaces to which the user device is to navigate. Next, the interface generation platform may generate, based on the sequence of interfaces predicted by the data model, an interface of the website or the program that includes one or more links to one or more predicted interfaces, of the sequence of interfaces to which the user device is predicted to navigate. Furthermore, the interface generation platform may provide the interface that includes the one or more links for display on the user device.

In this way, the interface generation platform is able to automatically generate and provide an interface that includes links to one or more predicted interfaces to which the user device is predicted to navigate. Furthermore, the interface generation platform reduces a utilization of processing resources and/or network resources that might otherwise be used to provide the user device with interfaces that a user associated with the user device is not interested in viewing.

Additionally, the interface generation platform may reduce a utilization of processing resources and/or network resources that might otherwise be used to navigate back and forth between the interfaces to which the user is not interested in viewing. For example, the interface generation platform may generate and provide an interface that uses a unified display configuration to display links to the predicted interfaces in a unified manner. Because the links are able to be provided as part of a unified display, the user device does not need to navigate back and forth between interfaces of the website of the program, thereby reducing utilization of processing resources and/or network resources. In other cases, the interface generation platform may reduce a utilization of processing resources and/or network resources in a similar manner, except by using a story-time display configuration, a display configuration that includes a next action button, and/or the like, as described further herein.

Additionally, or alternatively, the interface generation platform reduces a utilization of processing resources and/or network resources by using automated recommendations. For example, the interface generation platform may generate an automation recommendation that presents the user device with a plan for automatically performing one or more actions at scheduled time periods (e.g., an action that would otherwise be performed by the user device by interacting with a particular interface). This recommendation, if implemented, may reduce a utilization of network resources because the interface generation platform, or a server device used to support the website or the program, may be configured to automatically perform actions that are otherwise performed by the user device, thereby eliminating a need for devices to send and/or receive information via a network.

As another example, the interface generation platform may generate a recommendation that presents the user device with a plan for automatically providing the user device (or an account associated with the user device) with contents included in the one or more links displayed on the interface. This recommendation, if implemented, may reduce a utilization of resources (e.g., processing resources, network resources, etc.) because information may be automatically provided to the user device (or to the account associated with the user device), without the user device needing to access the program or the website, thereby saving resources that would otherwise be used to authenticate a user request to the website or the program, to load interfaces of the website or the program based on user interactions, and/or the like.

FIGS. 1A-1D are diagrams of an overview of an example implementation 100 described herein. For example, example implementation 100 may include an interface generation platform that performs one or more parts of an authentication procedure to generate and provide a user device with an interface that includes links to one or more predicted interfaces to which the user device is predicted to navigate.

As shown in FIG. 1A, and by reference number 105, the interface generation platform may obtain historical interactions information from a first data source (shown as Data Source A). For example, the interface generation platform may obtain historical interactions information for a group of user devices that have interacted with a set of interfaces of a website or a program.

In some implementations, before the interface generation platform obtains the historical interactions information, the group of user devices may interact with the set of interfaces over a particular time period (e.g., a week, a month, a year, etc.), and the interactions may be stored by the first data source as historical interactions information. For example, the first data source may store the historical interactions information using one or more data structures, such as a graph, a table, a linked-list, an array, a hash table, a tree, a database, and/or the like. In this case, the first data source may store large quantities of data (e.g., hundreds of thousands, millions, billions, etc. of data points), such that a human operator or an inferior data source may be objectively unable to store and/or process.

The historical interactions information may include information indicating a particular interface that a user device visited, information indicating a time and/or date at which the user device visited the particular interface, information indicating an amount of time that the user device spent on the particular interface before navigating to another interface, information indicating a feature of the particular interface to which the user device has navigated (e.g., a link, a button, a text box, a drop-down list, a toggle, an icon, a tooltip, etc.), information indicating a geographic area of the user device while visiting the particular interface, and/or the like.

As an example, if the website or the program relates to management of a user's financial accounts, the information indicating the particular interface may indicate that the user device visited a checking account interface, a savings account interface, a credit card interface, an investments interface, and/or the like. Additionally, the information indicating the features of the particular interface may indicate that the user device selected a button to navigate to an interface to view an account balance, a button to navigate to an interface to update an account (e.g., by making a debit or a credit to the account), a button to navigate to an interface to view information relating to a particular investment, a button to navigate to an interface to view a list of frequently asked questions (FAQs), and/or the like.

As another example, if the website or the program relates to a subscription news service, the information indicating the particular interface may indicate that the user device visited a particular news interface, such as an interface relating to headline news, political news, local news, national news, global news, investment news, sports news, health news, technology news, entertainment news, and/or the like.

As shown by reference number 110, the interface generation platform may obtain historical user account information from a second data source (shown as Data Source B). For example, the interface generation platform may obtain historical user account information for the group of users that have interacted with the set of interfaces of the website or the program.

In some implementations, before the interface generation platform obtains the historical user account information, the group of user devices may register for user accounts, and user account information for the user accounts may be stored by the second data source as historical user account information. For example, the second data source may store the historical user account information using one or more data structures, such as a graph, a table, a linked-list, an array, a hash table, a tree, a database, and/or the like. In this case, the second data source may store large quantities of data (e.g., hundreds of thousands, millions, billions, etc. of data points), such that a human operator or an inferior data source may be objectively unable to store and/or process. In some cases, a uniform data source may store both historical interactions information and historical user account information, and the interface generation platform may obtain or receive the information from the uniform data source.

The historical user account information may include a user account name, a user account password, a name of the user (e.g., a legal name), user contact information (e.g., a phone number, an e-mail address, etc.), user demographic information (e.g., an age of the user, a gender of the user, a race of the user, etc.), and/or the like. Continuing with one of the previous examples, if the website or the program relates to the user's financial accounts, the historical user account information may include information identifying a type of account (e.g., checking, savings, etc.), an account balance, transaction card information for one or more transaction cards that are issued to the user (e.g., a transaction card identifier, an expiration date, a withdrawal limitation, etc.), account transaction history, and/or the like.

Continuing with one of the previous examples, if the website or the program relates to the subscription news service, the historical user account information may include account information created for the subscription news service, which may include information describing a user profile (e.g., a name, an address, contact information, etc.), information indicating a type of subscription, information indicating a balance owed, and/or the like.

In this way, the interface generation platform is able to obtain historical information (e.g., the historical interactions information, the historical user account information, etc.) that may be used to train a data model that is able to predict interfaces that the user device is likely to visit, as described further herein.

Figure 1B:
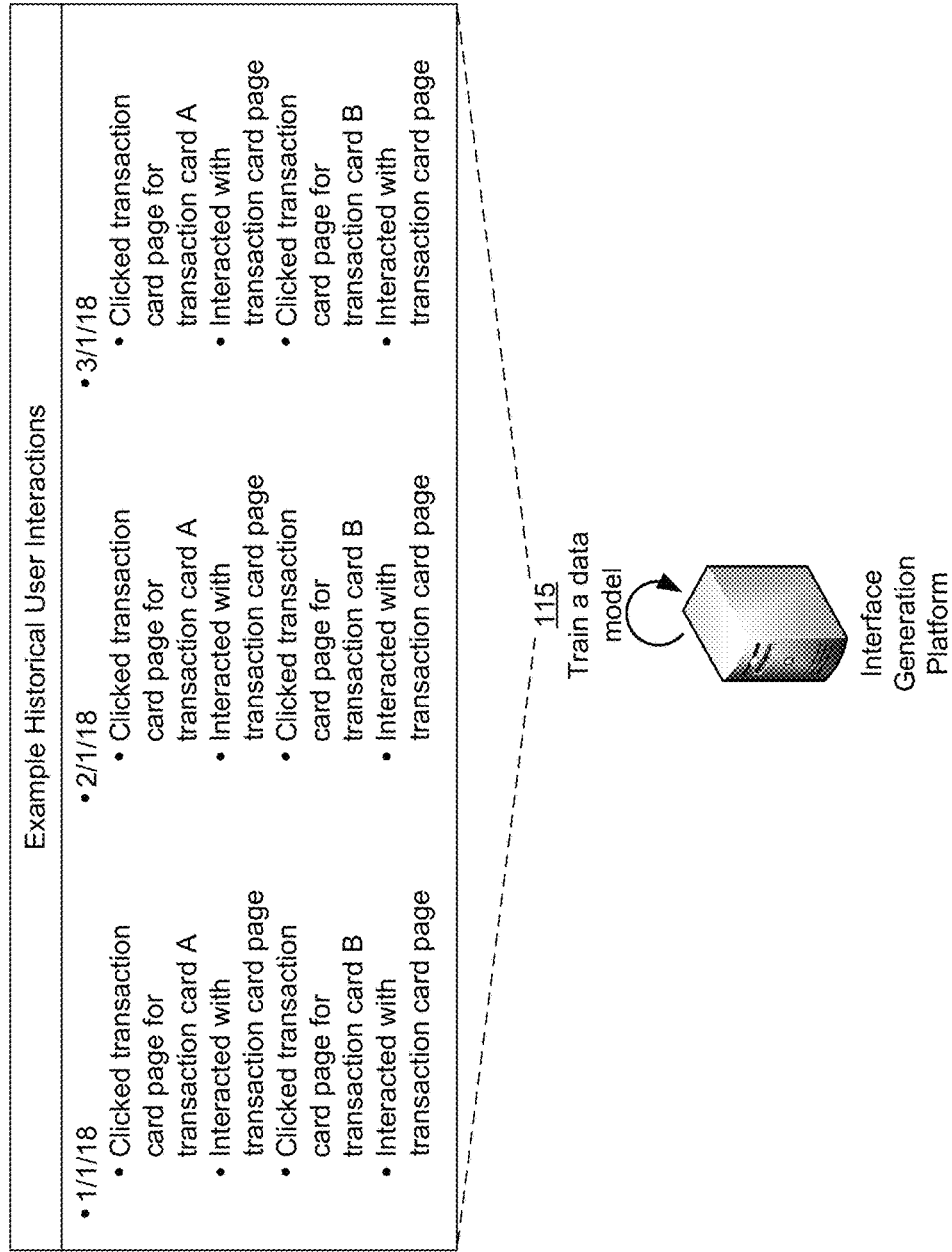

As shown in FIG. 1B, and by reference number 115, the interface generation platform may train a data model. For example, the interface generation platform may train a data model using a supervised machine learning technique, a clustering technique, a dimensionality reduction technique, a structured prediction technique, an anomaly detection technique, a technique utilizing a neural network, a reinforcement learning technique, and/or the like. In this case, the data model may be trained using the historical interactions information and the historical user account information for the group of user devices.

In some implementations, the interface generation platform may train a data model to identify trends relating to user interactions with the set of interfaces. For example, the interface generation platform may assign scores to different interfaces of the website or the program, depending on a likelihood of the different interfaces being accessed at particular time periods.

As shown as an example, assume a particular user device interacts with a website or a program on the first day of each month. Further assume the user device interacts with the website or the program by clicking on a transaction card page for transaction card A (e.g., a checking account page), by interacting with the transaction card page for transaction card A (e.g., to display an account balance), followed by clicking to a transaction card page for transaction card B (e.g., a credit card account page), and by interacting with the transaction card page for transaction card B (e.g., to use funds of transaction card A to make a payment to transaction card B).

In this example, the interface generation platform may assign a higher score to the particular interfaces that the user device interacts with on the first day of the month (relative to interfaces that the user device did not interact with on the first day of the month). As such, the data model is able to be trained to identify that when the user device interacts with the website or the program on the first day of the month, that the user device is likely to interact with the transaction card page for transaction card A and then the transaction card page for transaction card B.

In some implementations, the interface generation platform may train a data model to identify trends relating to interactions of users that share similar demographic information. For example, the interface generation platform may process historical user account information and historical interactions information for hundreds of thousands of users, millions of users, or more, to identify trends relating to particular demographics of users. In this case, the interface generation platform may assign scores to different interfaces of the website or the program based on a likelihood of a particular demographic of user's interacting with the different interfaces at a particular time period.

Additionally, or alternatively, the interface generation platform may train a data model to identify trends relating to interactions of users that share other types of information. For example, the interface generation platform may train a data model to identify trends relating to interactions of users that share location information, device information (e.g., of the user device used to access the website or the program), information indicating a time at which users register for user accounts (e.g., new users may have different interaction habits than experienced users), and/or the like. In this way, the interface generation platform is able to make predictions as to which interface the user device may interact with, even if the user device is interacting with the website or the program for the first time (e.g., because the data model may make predictions based on users that share demographic information, location information, registration information, etc.).

In this way, the interface generation platform may train a data model that is able to predict interfaces to which the user device is to navigate.

Figure 1C:
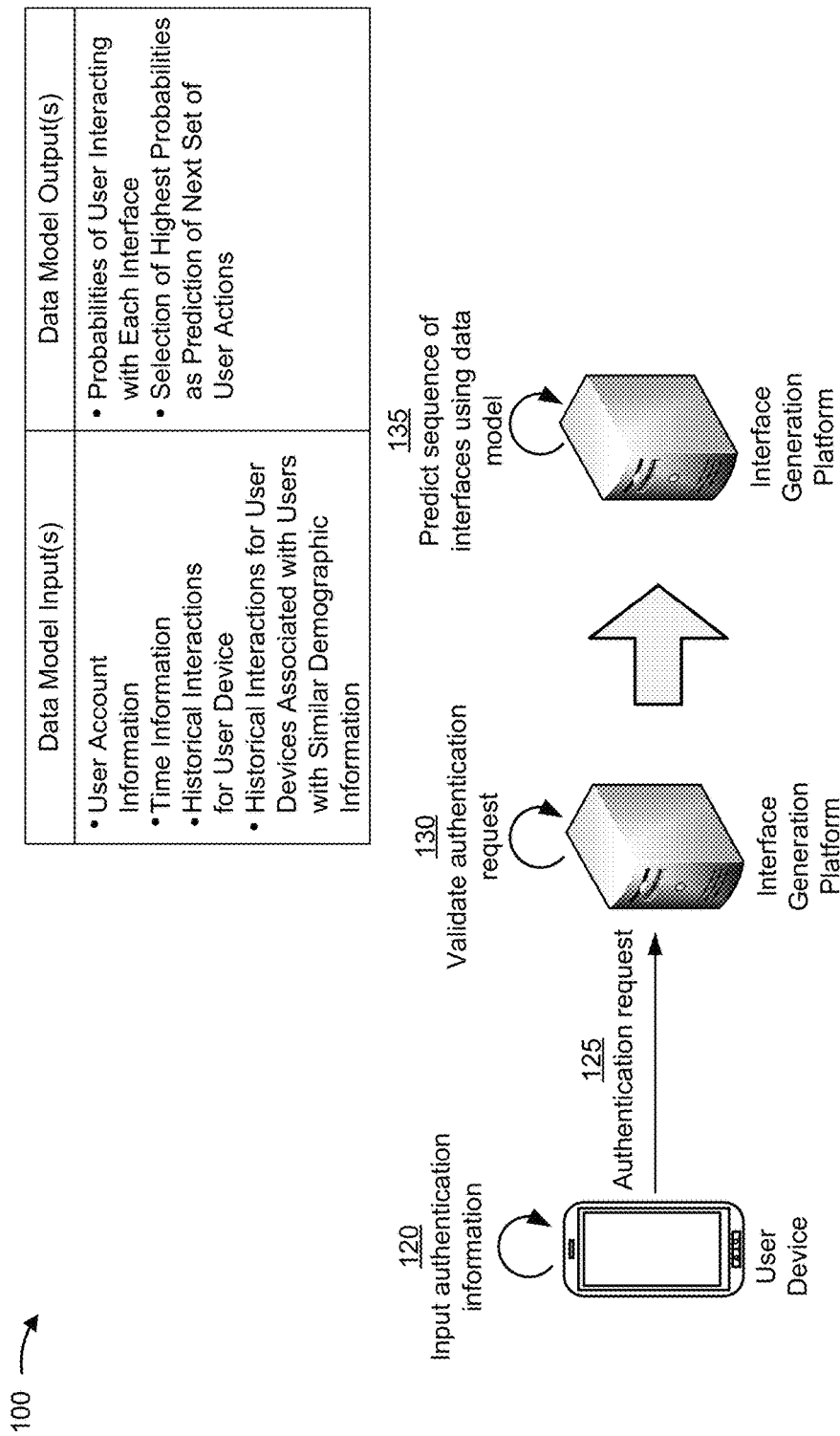

As shown in FIG. 1C, and by reference number 120, a user may interact with a user interface of a user device to input authentication information into the user interface. For example, a user may open up the website or the program, and may interact with an authentication interface to input authentication information (e.g., a username, a password, etc.) needed to access the website or the program. In this case, and as shown by reference number 125, the user inputting authentication information may cause the user device to provide an authentication request to the interface generation platform. The authentication request may include the authentication information that was input by the user.

As shown by reference number 130, the interface generation platform may validate the authentication request. For example, the interface generation platform may validate the authentication request by determining that the authentication information includes the correct username, the correct password, and/or the like. As an example, the interface generation platform may validate the authentication request by comparing the authentication information to authentication information that is associated with the user device and that is stored by a data structure.

In some cases, a device other than the interface generation platform may validate the authentication request. For example, a server device may be hosting the website or the program, and the server device may receive and validate the authentication request.

As shown by reference number 135, the interface generation platform may use the data model to predict a sequence of interfaces to which the user device may navigate. For example, the interface generation platform may provide, as input to the data model, user account information associated with the user device, time information indicating a time at which the user device is making the authentication request, historical interactions information of the user device (e.g., if the user is not a first-time user), historical interactions information of user devices that are associated with user's that have similar demographic information, user account information, and/or the like (e.g., if the user is a first-time user), and/or the like. In this case, the data model may output one or more scores indicating probabilities of the user device interacting with the set of interfaces.

Additionally, or alternatively, the data model may output scores indicating probabilities of the user device interacting with features included in the set of interfaces. In this case, the interface generation platform may use the probabilities to determine a sequence of interfaces to which the user device is most likely to navigate (e.g., by selecting one or more interfaces with a highest available probability, by selecting one or more interfaces that satisfy a threshold likelihood of being visited by the user device, etc.).

Continuing with the previous example, assume the website or the program includes ten interfaces, and that on the first of every month, the user device interacts with two of the interfaces (e.g., the transaction card page for transaction card A and the transaction card page for transaction card B). In this example, the interface generation platform may predict, based on the historical interactions information for the user device, and the time information indicating that the date is the first of the month, that the user device is going to interact with two interfaces, in sequence, by first interacting with the transaction card page for transaction card A, and second by interacting with the transaction card page for transaction card B.

In some cases, as described above, a server device may be hosting the website or the program, and the server device may receive and validate the authentication request. In this case, after the server device validates the authentication request, the server device may, using an application programming interface (API), provide a notification to the interface generation platform indicating that the authentication succeeded, thereby triggering the interface generation platform to predict the sequence of interfaces to which the user device is to navigate.

In this way, the interface generation platform is able to use the data model to predict the sequence of interfaces to which the user is to navigate.

Figure 1D:
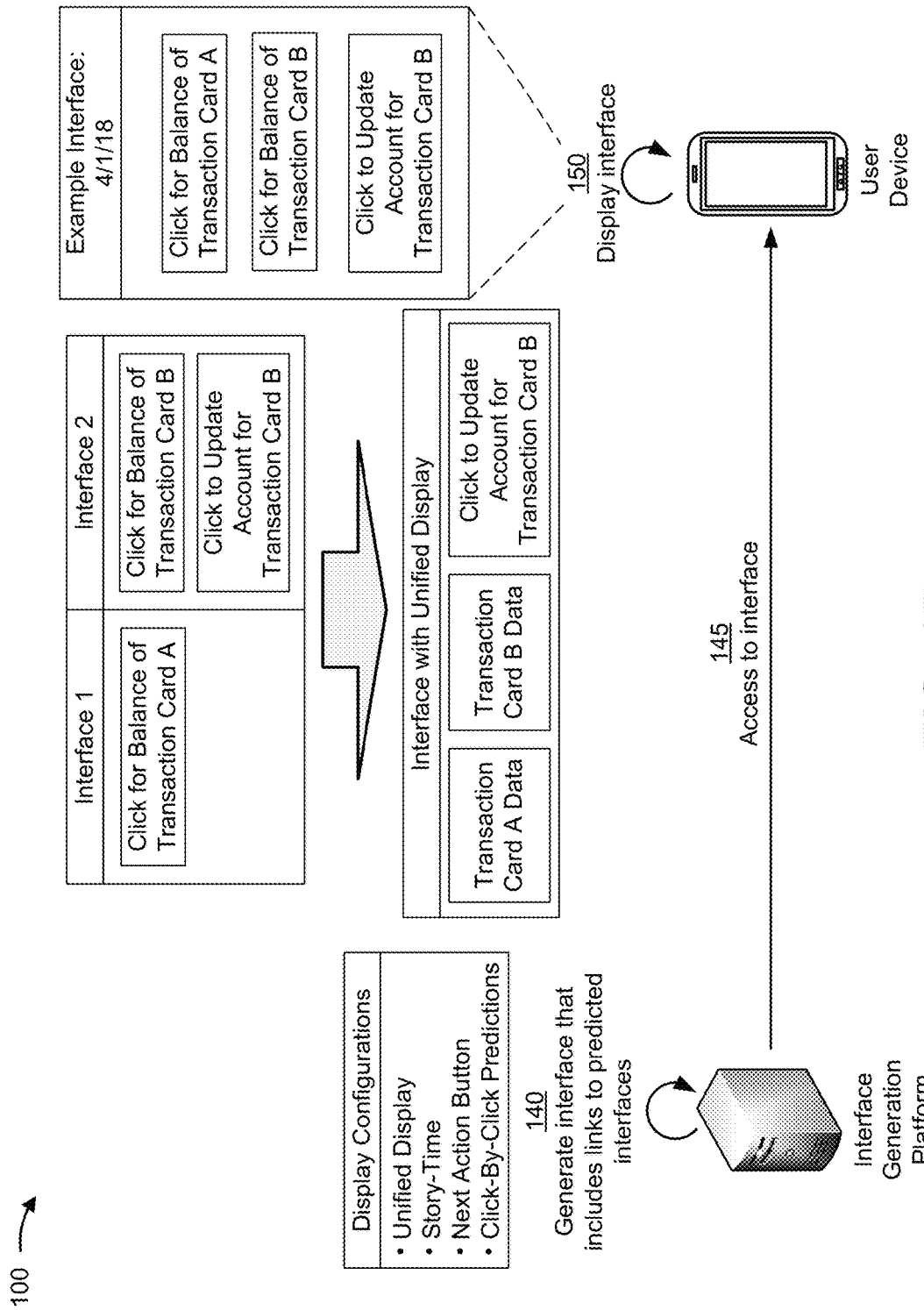

As shown in FIG. 1D, and by reference number 140, the interface generation platform may generate an interface that includes one or more links to one or more predicted interfaces that are part of the sequence of interfaces identified using the data model. The one or more links may be graphical representations of at least a portion of the one or more predicted interfaces, and, if a particular link is selected by the user device, a user interface on the user device may update to from displaying the interface that includes the one or more links to displaying a particular predicted interface.

In some implementations, the interface generation platform may generate an interface using a display configuration. The display configuration may determine a manner in which the one or more links are to be displayed on the interface. The display configuration may be a unified display configuration that organizes the one or more links to the one or more predicted interfaces in one place, a story-time display configuration that displays the one or more links individually and periodically throughout a time interval, a display configuration that includes a next action button to provide a real-time prediction of an interface that is predicted to be the next interface that the user device visits, a display configuration that allows one or more new links to be generated and displayed after each user interaction, a display configuration that utilizes one or more additional links to one or more predicted interfaces associated with third party websites or programs to which the user device is predicted to navigate, and/or the like, as each described below.

In some implementations, the interface generation platform may generate the interface using the unified display configuration. For example, the interface generation platform may generate the interface in a way that is able to display the one or more links to the one or more predicted interfaces in a unified manner. In some cases, the one or more links may include a first link to a first predicted interface, and one or more additional links to one or more additional predicted interfaces. In this case, the user device may be predicted to interact with the first link before the one or more additional links, and the first link may be more prominently displayed on the interface. For example, the first link may be displayed on a top portion of the interface, may be bolded, italicized, or in a different color than the one or more additional links, may be in a larger font than the one or more additional links, and/or the like.

As shown as an example, the interface generation platform may generate the interface using the unified display configuration to display three links to three predicted interfaces to which the user device is predicted to navigate. As shown, the three links may include a first link to the transaction card page for transaction card A, a second link to the transaction card page for transaction card B, and a third link to update the account associated with transaction card B using transaction card A. Additionally, the links may be graphical representations of portions of the predicted interfaces, and may include key features with which the user device is likely to interact. In this way, the user device may not need to click on the links, because the key features of the links are already displayed on the interface.

In some implementations, the interface generation platform may generate the interface using the story-time display configuration. For example, the interface generation platform may generate the interface to include a first link, of the one or more links, to a first predicted interface to which the user device is predicted to navigate. Additionally, the interface generation platform may generate the interface to update, after a threshold time period, to replace the first link with a second link, of the one or more links, to a second predicted interface to which the user device is predicted to navigate.

Additionally, or alternatively, the interface generation platform may generate the interface using the display configuration that includes the next action button. For example, the interface generation platform may generate the interface to include, along with a first link to a first predicted interface to which the user device is predicted to navigate, the next action button. The next action button may be capable of changing the first link to a second link that is to a second predicted interface to which the user device is predicted to navigate. The contents shown in the next action button may update dynamically in real-time based on a most recent interaction that the user device has performed on the interface.

Additionally, or alternatively, the interface generation platform may generate the interface using the display configuration that allows one or more new links to be generated and displayed after each user interaction. For example, the interface generation platform may generate the interface to include the one or more links to the one or more predicted interfaces. In this case, after the interface is provided for display on the user device, the interface generation platform may receive, from the user device, an indication that the user device has interacted with a first link of the one or more links. This may cause the interface generation platform to update the interface to the first predicted interface. Additionally, the interface generation platform may display the remaining one or more links within the first predicted interface, and may generate one or more new links based on the user's selection of the first link.

In some cases, the interface generation platform may receive an indication that the user device has interacted with the interface, but that the interaction is not with the one or more links. In this case, the interface generation platform may predict, using the data model, a new sequence of interfaces to which the user device may navigate, based on the interface selected by the user device (e.g., which was not one of the one or more links). Additionally, the interface generation platform may modify the interface to replace the one or more links with one or more new links to one or more new predicted interfaces, of the new sequence of interfaces to which the user device is predicted to navigate. Furthermore, the interface generation platform may provide the modified interface for display on the user device.

Additionally, or alternatively, the interface generation platform may generate the interface using the display configuration that utilizes an additional link to a predicted interface associated with a third party website or program to which the user device is predicted to navigate. For example, the interface generation platform may, while training the data model, train the data model using historical user account information that identifies historical user interactions with interfaces of third-party websites or programs. As an example, historical account information for a financial account may include a transaction history, which may display reoccurring debits and/or credits to the account of the user. These debits and/or credits may be paid to or payable from particular third-party websites or programs. In this case, the interface generation platform may generate the interface to include, as part of the one or more links, an additional link to a predicted interface of a third party website or program to which the user device is predicted to navigate.

To the extent the above implementation may require permissions, it should be understood that such information is to be used in accordance with all applicable laws. For example, processing of information indicating a transaction history of an account may require a registered user to consent via an opt-in procedure. Additionally, the registered user may be permitted to remove consent via an opt-out procedure. Furthermore, to display a link to a third party website or program, an authorized individual associated with the third party website or program may have to provide permission to display the link.

As shown by reference number 145, the interface generation platform may provide the user device with access to the interface that has been generated. For example, after completing the authentication, the user device may be automatically routed to the interface. As shown by reference number 150, the user device may display the interface of the website or the program using a user interface of the user device. Continuing with the previous example, the user device may display, on the user interface, the first link, the second link, and the third link, thereby eliminating a need for the user device to navigate through various interfaces within the website or the program. In this way, the interface generation platform reduces a utilization of processing resources and/or network resources that might otherwise be used to provide the user device with interfaces that the user is not interested in viewing.

In some implementations, the interface generation platform may generate an automation recommendation that presents the user device with a plan for automatically performing one or more interactions at scheduled time periods. For example, the interface generation platform may generate an automation recommendation that includes a plan for automated account updating (e.g., automated bill pay), a plan for automatically providing contents of the one or more links to the user device or to an account associated with the user (e.g., without needing access to the website or the program), a plan for upgrading or modifying a user account, and/or the like. In this case, the interface generation platform may provide the automation recommendation for display on the user device.

If the user device accepts the automation recommendation, the interface generation platform may implement the automated recommendation. For example, if the automation recommendation includes a plan for automated bill pay, the interface generation platform may update the interface of the website or the program to an interface that permits the user device to set up automated bill pay. In other cases, the interface generation platform may automatically schedule the automated bill pay, without any further interaction from the user device. Additionally, if the user habitually pays a particular amount, the automated bill pay may be set up to make payments that coincide with the particular amount that the user habitually pays.

As another example, if the automation recommendation that is accepted includes a plan for automatically providing the user device or an account of the user with contents included in the one or more links, the interface generation platform may automatically provide the contents of the one or more links to the user device or to the account of the user. For example, the interface generation platform may provide, at particular time periods, the contents of a link (e.g., a current account balance, a current rating, etc.) to the user device or to the account of the user via a short message service (SMS) text message, via an e-mail message, via a voice mail, and/or the like. In this way, the user device does not need to interact with the website or the program to obtain the contents of the link, thereby reducing a utilization of network resources and/or processing resources of the user device.

As another example, if the automation recommendation that is accepted includes a plan for upgrading or updating a user account, the interface generation platform may automatically perform one or more actions associated with upgrading or modifying the user account. For example, if user account information is to be updated, the interface generation platform may automatically update the user account with the new user account information. As another example, if the user account is to be upgraded, and the upgrade requires meeting with an account specialist, the interface generation platform may automatically identify a physical store in a geographic region of the user device, may schedule an appointment with the account specialist, and may update an electronic calendar of the account specialist and/or an electronic calendar of the user with the scheduled appointment.

In this way, the interface generation platform is able to automatically generate and provide an interface that includes links to one or more predicted interfaces to which the user device is predicted to navigate. Furthermore, the interface generation platform reduces a utilization of processing resources and/or network resources that might otherwise be used to provide the user device with interfaces that a user associated with the user device is not interested in viewing.

As indicated above, FIGS. 1A-D are provided merely as an example. Other examples are possible and may differ from what was described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of example implementation 100 may perform one or more functions described as being performed by another set of devices of example implementation 100.

Figure 2:
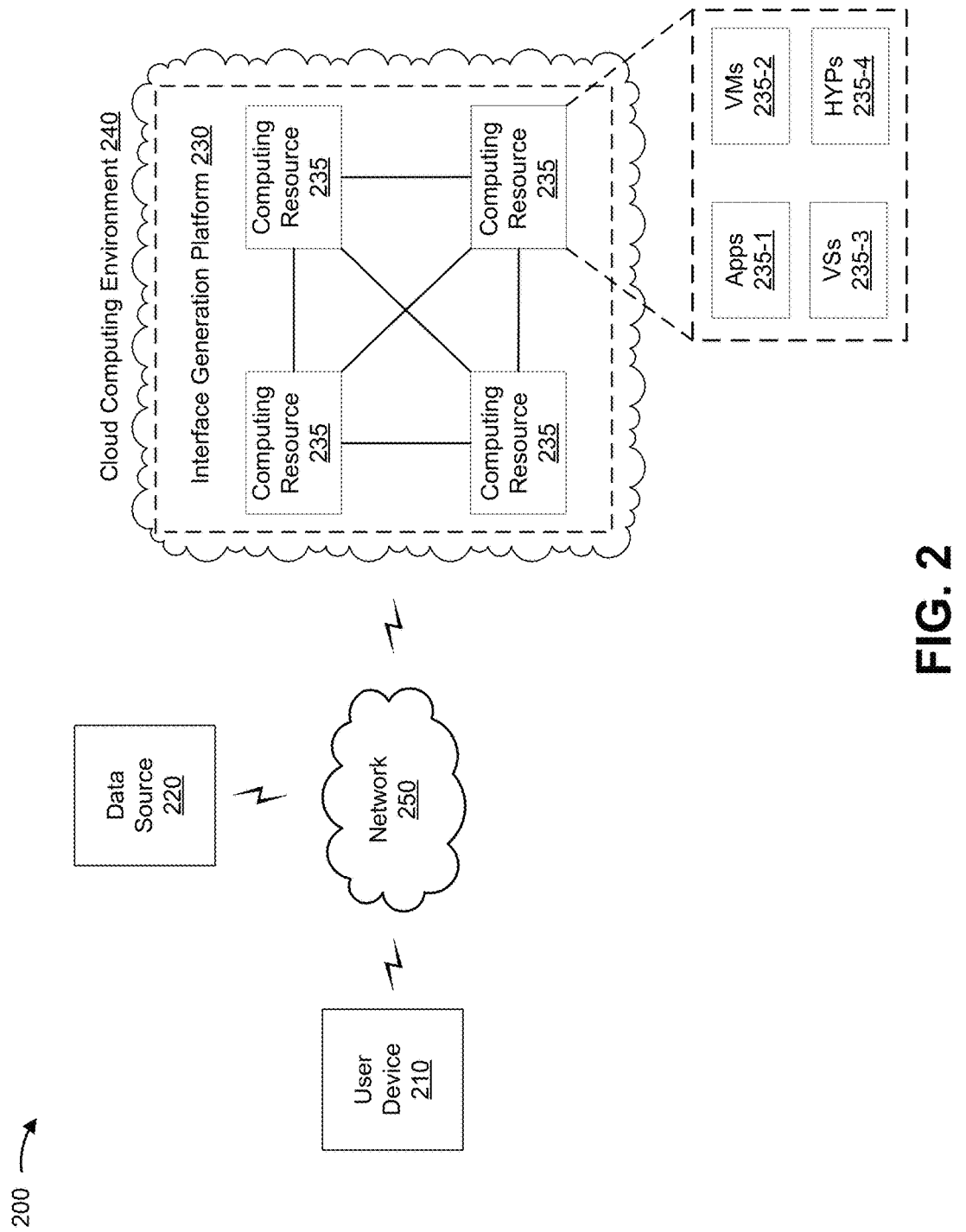
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, example environment 200 may include a user device 210, a data source 220, an interface generation platform 230 hosted by a cloud computing environment 240, and/or a network 250. Devices of example environment 200 may interconnect via wired connections, wireless connections, or a combination of connections.

User device 210 includes one or more devices capable of receiving, generating, storing, processing, and/or providing information associated with interactions with a website or a program. For example, user device 210 may include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), or a similar type of device.

In some implementations, user device 210 may provide interactions information associated with interactions with interfaces of a website or a program to data source 220 (to be stored as historical interactions information). In some implementations, user device 210 may provide, to interface generation platform 230 or to a validation server, an authentication request need to access the program or the website. In some implementations, user device 210 may receive, from interface generation platform 230 or the validation server, an indication of whether the authentication request succeeded. In some implementations, user device 210 may receive, from interface generation platform 230, an interface that includes one or more links to one or more predicted interfaces to which user device 210 is predicted to navigate.

Data source 220 includes one or more devices capable of receiving, storing, processing, and/or providing historical information associated with a group of user devices that have accessed a website or a program. For example, data source 220 may include a server device or a group of server devices. In some implementations, data source 220 may receive a request for historical information (e.g., historical interactions information, historical user account information, etc.) for the group of user devices 210 from interface generation platform 230. In some implementations, data source 220 may be configured to automatically provide the historical information for the group of user devices 210 to interface generation platform 230.

Interface generation platform 230 includes one or more devices capable of receiving, storing, generating, processing, and/or providing information associated with a website or a program. For example, interface generation platform 230 may include a server device (e.g., a host server, a web server, an application server, etc.), a data center device, or a similar device.

In some implementations, as shown, interface generation platform 230 may be hosted in cloud computing environment 240. Notably, while implementations described herein describe interface generation platform 230 as being hosted in cloud computing environment 240, in some implementations, interface generation platform 230 might not be cloud-based (i.e., may be implemented outside of a cloud computing environment) or might be partially cloud-based.

Cloud computing environment 240 includes an environment that hosts interface generation platform 230. Cloud computing environment 240 may provide computation, software, data access, storage, and/or other services that do not require end-user knowledge of a physical location and configuration of system(s) and/or device(s) that host interface generation platform 230. As shown, cloud computing environment 240 may include a group of computing resource 235 (referred to collectively as "computing resources 235 and individually as "computing resource 235").

Computing resource 235 includes one or more personal computers, workstation computers, server devices, or another type of computation and/or communication device. In some implementations, computing resource 235 may host interface generation platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with interface generation platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
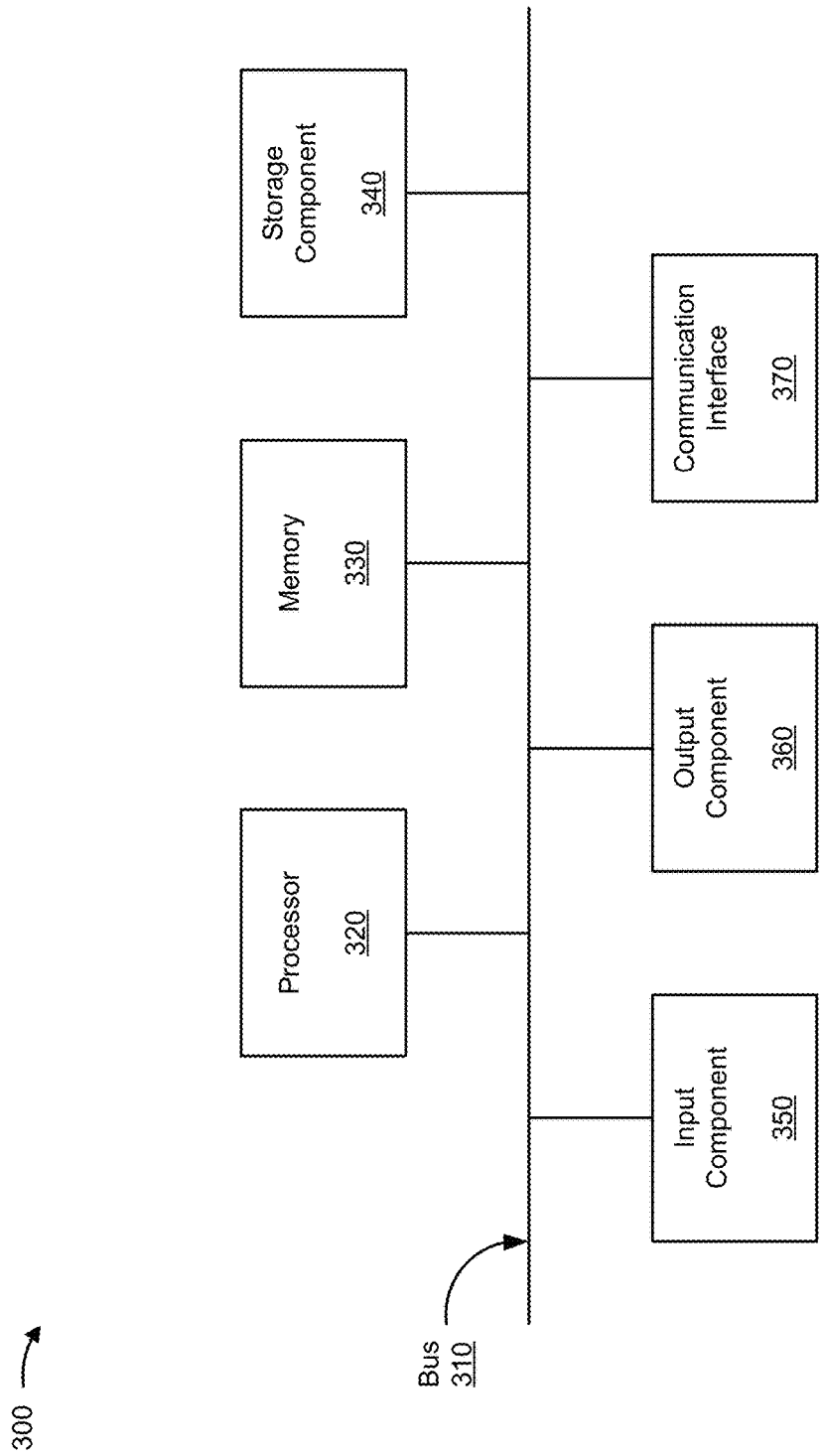
FIG. 3 is a diagram of example components of one or more devices of FIG. 2.

FIG. 3 is a diagram of example components of a device 300. Device 300 may correspond to user device 210, data source 220, and/or interface generation platform 230. In some implementations, user device 210, data source 220, and/or interface generation platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in location of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
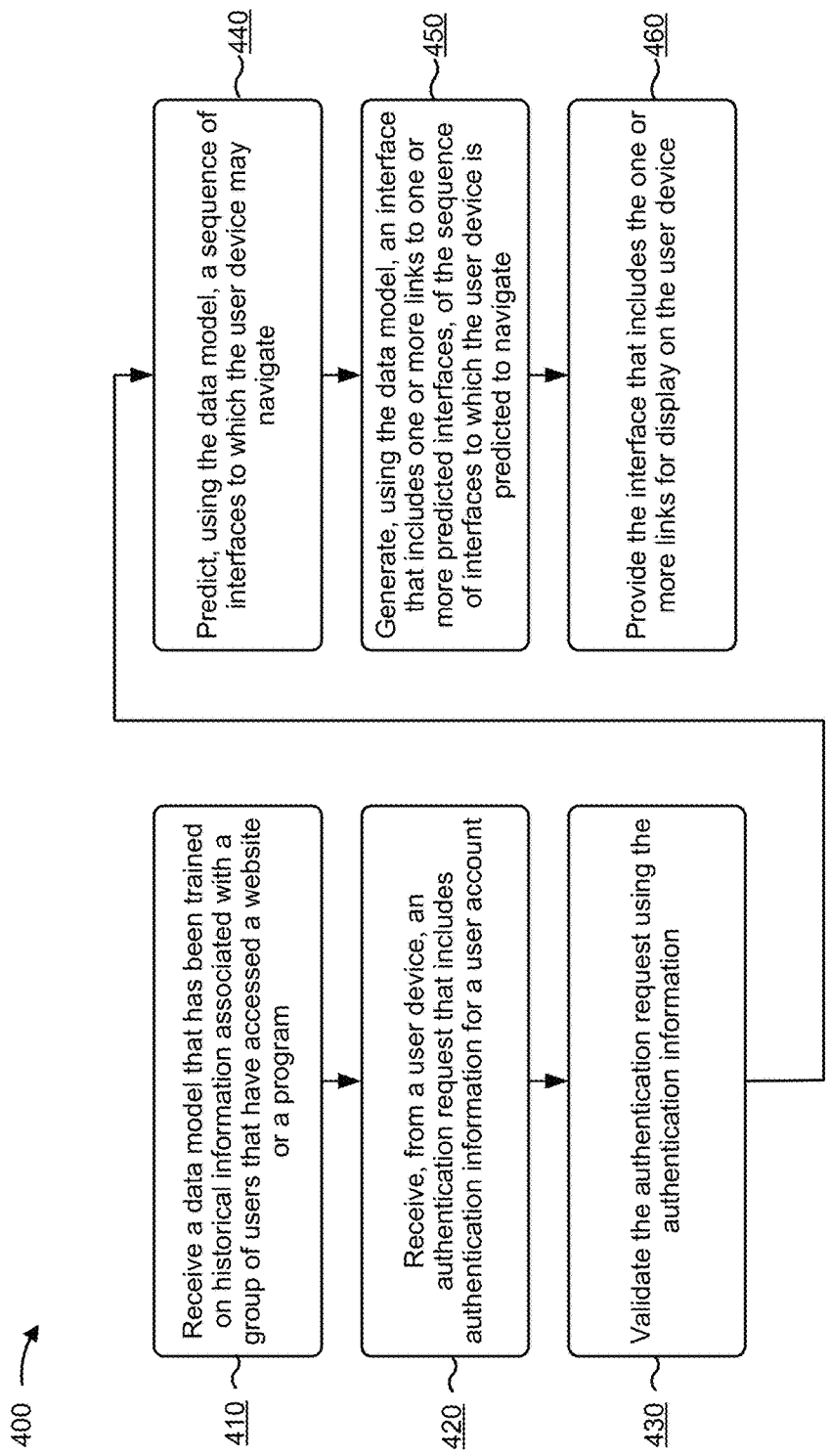
FIG. 4 is a flow chart of an example process for using machine learning to selectively generate and display interfaces of a website or program.

FIG. 4 is a flow chart of an example process 400 for using machine learning to selectively generate and display interfaces of a website or program. In some implementations, one or more process blocks of FIG. 4 may be performed by interface generation platform 230. In some implementations, one or more process blocks of FIG. 4 may be performed by another device or a group of devices separate from or including interface generation platform 230, such as user device 210 and/or data source 220.

As shown in FIG. 4, process 400 may include receiving a data model that has been trained on historical information associated with a group of users that have accessed a website or a program (block 410). For example, an interface generation platform (e.g., interface generation platform 230, using computing resource 235, processor 320, input component 350, etc.) may receive a data model that has been trained on historical information associated with a group of users that have accessed a website or a program, as described, for example, in connection with FIGS. 1A-1D above.

As further shown in FIG. 4, process 400 may include receiving, from a user device, an authentication request that includes authentication information for a user account (block 420). For example, the interface generation platform (e.g., interface generation platform 230, using computing resource 235, processor 320, input component 350, etc.) may receive, from a user device (e.g., user device 210), an authentication request that includes authentication information for a user account, as described, for example, in connection with FIGS. 1A-1D above.

As further shown in FIG. 4, process 400 may include validating the authentication request using the authentication information (block 430). For example, the interface generation platform (e.g., interface generation platform 230, using computing resource 235, processor 320, etc.) may validate the authentication request using the authentication information, as described, for example, in connection with FIGS. 1A-1D above.

As further shown in FIG. 4, process 400 may include predicting, using the data model, a sequence of interfaces to which the user device may navigate (block 440). For example, the interface generation platform (e.g., interface generation platform 230, using computing resource 235, processor 320, etc.) may predict, using the data model, a sequence of interfaces to which the user device may navigate, as described, for example, in connection with FIGS. 1A-1D above.

As further shown in FIG. 4, process 400 may include generating, using the data model, an interface that includes one or more links to one or more predicted interfaces, of the sequence of interfaces to which the user device is predicted to navigate (block 450). For example, the interface generation platform (e.g., interface generation platform 230, using computing resource 235, processor 320, etc.) may generate, using the data model, an interface that includes one or more links to one or more predicted interfaces, of the sequence of interfaces to which the user device is predicted to navigate.

As further shown in FIG. 4, process 400 may include providing the interface that includes the one or more links for display on the user device (block 460). For example, the interface generation platform (e.g., interface generation platform 230, using computing resource 235, output component 360, etc.) may provide the interface that includes the one or more links for display on the user device.

Process 400 may include additional implementations, such as any single implementation or any combination of implementations described below.

In some implementations, the interface generation platform may generate the interface using a unified display configuration. The one or more links included in the interface may be a plurality of links that include a first link and one or more additional links. The first link may be a link that the user device is predicted to navigate to before the one or more additional links.

In some implementations, the interface generation platform may generate the interface using a story-time display configuration. The one or more links included in the interface may include a first link to which the user device is predicted to navigate. The story-time display configuration may allow the interface to update, after a threshold time period, to replace the first link with a second link, of the one or more links to which the user device is predicted to navigate. In some cases, the first link may be prominently displayed on the interface relative the one or more additional links. In this case, after the first link is replaced with the second link, the second link may be prominently displayed relative to the one or more additional links.

In some implementations, the interface generation platform may generate the interface using a display configuration includes a next action button. The one or more links included in the interface may include a first link to which the user device is predicted to navigate and the next action button. The next action button may be capable of changing the first link to a second link of the one or more links.

In some implementations, where the one or more links included in the interface are a plurality of links that include a first link and one or more additional links. Additionally, the interface generation platform may receive, from the user device, an indication that the user device has interacted with the first link. Additionally, the interface generation platform may provide, for display on the user device, a first predicted interface associated with the first link. The first predicted interface may include content associated with the first predicted interface and the one or more additional links.

In some implementations, the interface generation platform may receive, from the user device, an indication that the user device has performed a particular interaction with the interface. Additionally, the interface generation platform may determine that the particular interaction is not an interaction with the one or more links. Additionally, the interface generation platform may predict, using the data model, a new sequence of interfaces to which the user device will navigate, based on the particular interaction with the interface. Additionally, the interface generation platform may modify, based on the new sequence of interfaces predicted by the data model, the interface of the website or the program to replace the one or more links with one or more additional links to one or more additional predicted interfaces, of the new sequence of interfaces, to which the user device is predicted to navigate. Additionally, the interface generation platform may provide the interface that has been modified for display on the user device.

In some implementations, the interface generation platform may receive the data model. The historical user account information may indicate historical user interactions with interfaces of a set of third party websites or programs. Additionally, the interface generation platform may generate the interface to include, as part of the one or more links, one or more particular links to one or more particular predicted interfaces associated with the set of third party websites or programs to which the user device is predicted to navigate.

In some implementations, the interface generation platform may select a particular display configuration, of a set of display configurations for the interface. The set of display configurations may include a unified display configuration, a story-time display configuration, a display configuration that includes a next action button, and a display configuration that permits the interface to be modified to include new links after an interaction is made by the user device. Additionally, the interface generation platform may generate the interface using the particular display configuration.

In some implementations, the interface generation platform may generate the interface to include, as part of the one or more links, one or more particular links to one or more particular predicted interfaces associated with a set of third party websites or programs to which the user device is predicted to navigate.

In some implementations, the interface generation platform may generate, before providing the interface for display on the user device, an automation recommendation that presents the user device with a plan for automatically performing one or more interactions at scheduled time periods. Additionally, the interface generation platform may provide the automation recommendation for display on the interface of the user device.

In some implementations, the interface generation platform may generate, after providing the interface for display on the user device, an automation recommendation that presents the user device with a plan for automatically providing the user device or an account associated with the user device with contents associated with the interface. Additionally, the interface generation platform may provide the automation recommendation for display on the interface. Additionally, the interface generation platform may receive an indication that the user device has accepted the automation recommendation. Additionally, the interface generation platform may automatically provide the contents associated with the interface to the user device or to the account associated with the user device.

In some cases, process 400 may include implementations that are separate from those described in block 410 through block 460, such as any single implementation or any combination of implementations described below.

In some implementations, an interface generation platform may provide, for display in a first area of a graphical user interface (GUI), a first link to a first predicted interface within a program or website. The first predicted interface may be an interface to which a user is predicted to navigate. The first link may be a graphical representation of at least a portion of the first predicted interface. Additionally, the interface generation platform may provide, for display in a second area of the GUI, one or more additional links to one or more additional predicted interfaces within the program or the website. The first link may be more prominently displayed in relation to the one or more additional links. The one or more additional predicted interfaces may be interfaces to which the user is predicted to navigate. The one or more additional links may be graphical representations of at least a portion of the one or more additional predicted interfaces.

In some implementations, the interface generation platform may provide the first link for display using a story-time display configuration. The story-time display configuration may display the first link and not the one or more additional links. Additionally, the interface generation platform may provide, after a threshold time period, an additional link, of the one or more additional links, based on the story-time display configuration.

In some implementations, the interface generation platform may provide the first link, for display, using a display configuration that includes a next action button. The next action button may be selectable by the user device and may be capable of changing the first link that is being displayed to another link, of the one or more additional links to which the user device is predicted to navigate.

In some implementations, the interface generation platform may receive an indication that the user device has interacted with the first link or an additional link of the one or more additional links. Additionally, the interface generation platform may provide, for display in the first area of the GUI, a second link to a second predicted interface within the program or the website. The second link may be part of the one or more additional links or a new link to a new predicted interface within the program or the website. The second link may be a graphical representation of at least a portion of the second predicted interface. Additionally, the interface generation platform may provide, for display in the second area of the GUI, one or more particular links to one or more particular interfaces within the program or the website. The one or more particular links may include links that are part of the one or more additional links and/or links that are not part of the one or more additional links. The one or more particular links may be graphical representations of at least a portion of the one or more particular interfaces.

In some implementations, the interface generation platform may provide, for display in a third area of the GUI, another link to a predicted interface that is outside of the program or the website.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, the interface generation platform is able to automatically generate and provide an interface that includes links to one or more predicted interfaces to which the user device is predicted to navigate. Furthermore, the interface generation platform reduces a utilization of processing resources and/or network resources that might otherwise be used to provide the user device with interfaces that a user associated with the user device is not interested in viewing.

In some cases, the interface generation platform may reduce a utilization of processing resources and/or network resources that might otherwise be used to navigate back and forth between intermediary interfaces and/or interfaces to which the user is not interested in viewing. For example, the interface generation platform may generate and provide an interface that uses a unified display configuration to display links to the predicted interfaces in a unified manner. Because the links are able to be provided as part of a unified display, the user device does not need to navigate back and forth between interfaces of the website of the program, thereby reducing utilization of processing resources and/or network resources. In other cases, the interface generation platform may reduce a utilization of processing resources and/or network resources in a similar manner, except by using a story-time display configuration, a display configuration that includes a next action button, and/or the like, as described further herein.

Additionally, or alternatively, the interface generation platform reduces a utilization of processing resources and/or network resources using automated recommendations. For example, the interface generation platform may generate an automation recommendation that presents the user device with a plan for automatically performing one or more interactions at scheduled time periods. This recommendation, if implemented, may reduce a utilization of network resources because a backend server may be configured to automatically perform interactions that are otherwise performed by the user device, thereby eliminating a need for devices to send and/or receive information via a network.

As another example, the interface generation platform may generate a recommendation that presents the user device with a plan for automatically providing the user device (or an account associated with the user device) with contents associated with the interface. This recommendation, if implemented, may reduce a utilization of processing resources and/or network resources because information may be automatically provided to the user device (or to the account associated with the user device), without the user device needing to access the program or the website, which may otherwise require an authentication and a series of interactions with interfaces to access the content.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive a data model that has been trained on historical information associated with a group of users that have accessed a website or program,
wherein the website or the program include a set of interfaces,
wherein the historical information includes:
historical interactions information indicating historical user interactions with the set of interfaces of the website or the program, and
historical user account information associated with the group of users, and
wherein the data model is to be used after an authentication procedure associated with the website or the program;
receive, from a user device, an authentication request that includes authentication information for a user account;
validate the authentication request using the authentication information;
predict, using the data model, a sequence of interfaces to which the user device will navigate after being authenticated;
select a particular display configuration, of a set of display configurations,
wherein the set of display configurations include:
a unified display configuration,
the unified display configuration to display one or more links in one location,
a story-time display configuration,
the story-time display configuration to display the one or more links individually and periodically throughout a time interval,
a first display configuration that includes a button that provides a real-time prediction of a next interface that is predicted to be visited, and
a second display configuration that allows one or more interfaces to be modified to include new links to be displayed after an interaction is received from the user device,
generate, based on the sequence of interfaces predicted by the data model, an interface of the website or the program that includes one or more links to one or more predicted interfaces, of the sequence of interfaces to which the user device is predicted to navigate,
the interface of the website or the program being generated using the particular di splay configuration; and
provide the interface that includes the one or more links for display on the user device.

2. The device of claim 1, wherein the one or more processors, when generating the interface of the web site or the program, are to:
generate the interface using the unified display configuration,
wherein the one or more links included in the interface are a plurality of links that include a first link and one or more additional links, and
wherein the first link is a link that the user device is predicted to navigate to before the one or more additional links.

3. The device of claim 1, wherein the one or more processors, when generating the interface of the web site or the program, are to:
generate the interface using the story-time display configuration,
wherein the one or more links included in the interface include a first link to which the user device is predicted to navigate, and
wherein the story-time display configuration allows the interface to update, after a threshold time period, to replace the first link with a second link, of the one or more links to which the user device is predicted to navigate.

4. The device of claim 1, wherein the one or more processors, when generating the interface of the web site or the program, are to:
generate the interface using the first display configuration that includes the button that provides the real-time prediction of the next interface that is predicted to be visited,
wherein the one or more links included in the interface include a first link to which the user device is predicted to navigate,
wherein the button is selectable by the user device and is capable of changing the first link to a second link of the one or more links, and
wherein the second link is another link to which the user device is predicted to navigate.

5. The device of claim 1, wherein the one or more links included in the interface are a plurality of links that include a first link and one or more additional links; and wherein the one or more processors, are further to:
receive, from the user device, an indication that the user device has interacted with the first link; and
provide, for display on the user device, a first predicted interface associated with the first link,
wherein a first portion of the first predicted interface includes content of the first predicted interface, and
wherein a second portion of the first predicted interface includes the one or more additional links.

6. The device of claim 1, wherein the one or more processors are further to:
receive, from the user device, an indication that the user device has performed a particular interaction with the interface;
determine that the particular interaction is not an interaction with the one or more links;
predict, using the data model, a new sequence of interfaces to which the user device will navigate, based on the particular interaction with the interface;

modify, based on the new sequence of interfaces predicted by the data model, the interface of the website or the program to replace the one or more links with one or more additional links to one or more additional predicted interfaces, of the new sequence of interfaces, to which the user device is predicted to navigate; and provide the interface that has been modified for display on the user device.

7. The device of claim 1, wherein the one or more processors, when receiving the data model, are to:

receive the data model,
wherein the historical user account information indicates historical user interactions with interfaces of a set of third party websites or programs; and
wherein the one or more processors, when generating the interface of the website or the program, are to:
generate the interface to include, as part of the one or more links, one or more particular links to one or more particular predicted interfaces associated with the set of third party web sites or programs to which the user device is predicted to navigate.

8. A method, comprising:

receiving, by a device, a data model that has been trained on historical information associated with a group of users that have accessed a website or a program,
wherein the website or the program include a set of interfaces, and
wherein the historical information includes:
historical interactions information indicating historical user interactions with the set of interfaces of the website or the program, and
historical user account information associated with the group of users;
predicting, by the device and by using the data model, a sequence of interfaces to which a user device will navigate after being authenticated,
wherein the sequence of interfaces is based on a particular time period that the user device is to access the website or the program,
selecting, by the device, a particular display configuration, of a set of display configurations,
wherein the set of display configurations include:
a unified display configuration,
the unified display configuration to display one or more links in one location,
a story-time display configuration,
the story-time display configuration to display the one or more links individually and periodically throughout a time interval,
a first display configuration that includes a button that provides a real-time prediction of a next interface that is predicted to be visited, and
a second display configuration that allows one or more interfaces to be modified to include new links to be displayed after an interaction is received from the user device;
generating, by the device and based on the sequence of interfaces predicted by the data model, an interface of the website or the program that includes one or more links to one or more predicted interfaces, of the sequence of interfaces to which the user device is predicted to navigate,
the interface of the website or the program being generated using the particular display configuration;
receiving, by the device and from the user device, an authentication request that includes authentication information for a user account;

validating, by the device, the authentication request using the authentication information;
selecting, by the device, the interface that includes the one or more links to the one or more predicted interfaces, based on a time at which the authentication request is received matching with the particular time period that was used to predict the sequence of interfaces; and
providing, by the device and for display on the user device, the interface that includes the one or more links.

9. The method of claim 8, wherein the historical information further includes:

information indicating a geographic area associated with the user device when the user device used a particular interface.

10. The method of claim 8, wherein generating the interface of the website or the program comprises:

generating the interface using the story-time display configuration,
wherein the one or more links included in the interface are a plurality of links that include a first link and one or more additional links,
wherein the first link is prominently displayed on the interface relative to the one or more additional links, and
wherein the story-time display configuration allows the interface to update, after a threshold time period, to replace the first link with a particular additional link, of the one or more additional links to which the user device is predicted to navigate, and
wherein the particular additional link, of the one or more additional links, is to be prominently displayed on the interface relative to the one or more additional links.

11. The method of claim 8, wherein generating the interface of the website or the program comprises:

generating the interface using a first display configuration, of the set of display configurations, that includes the button that provides the real-time prediction of the next interface that is predicted to be visited,
wherein the one or more links included in the interface include a first link to which the user device is predicted to navigate, and
wherein the button is selectable by the user device and is capable of changing the first link to a second link of the one or more links.

12. The method of claim 8, wherein generating the interface of the website or the program comprises:

generating the interface to include, as part of the one or more links, one or more particular links to one or more particular predicted interfaces associated with a set of third party websites or programs to which the user device is predicted to navigate.

13. The method of claim 8, further comprising:

generating, before providing the interface for display on the user device, an automation recommendation that presents the user device with a plan for automatically performing one or more interactions at scheduled time periods; and
providing the automation recommendation for display on the interface.

14. The method of claim 8, further comprising:

generating, after providing the interface for display on the user device, an automation recommendation that presents the user device with a plan for automatically providing the user device or an account associated with the user device with contents associated with the interface; and providing the automation recommendation for display on the interface;
receiving an indication that the user device has accepted the automation recommendation; and
automatically providing the contents associated with the interface to the user device or to the account associated with the user device.

15. A non-transitory computer-readable medium storing instructions, the instructions comprising:
one or more instructions that, when executed by one or more processors of a device, cause the one or more processors to:
receive a machine learning model that has been trained on historical information associated with a group of users that have accessed a website or program,
wherein the web site or the program include a set of interfaces,
wherein the historical information includes:
historical interactions information indicating historical user interactions with the set of interfaces of the website or the program, and
historical user account information associated with the group of users;
receive, from a user device, an authentication request that includes authentication information for a user account;
validate the authentication request using the authentication information;
predict, using the machine learning model, a sequence of interfaces to which the user device will navigate after being authenticated,
select a particular display configuration, of a set of display configurations,
wherein the set of display configurations include:
a unified display configuration,
the unified display configuration to display one or more links in one location,
a story-time display configuration,
the story-time display configuration to display the one or more links individually and periodically throughout a time interval,
a first display configuration that includes a button that provides a real-time prediction of a next interface that is predicted to be visited, and
a second display configuration that allows one or more interfaces to be modified to include new links to be displayed after an interaction is received from the user device;
generate, based on the sequence of interfaces predicted by the machine learning model, an interface of the website or the program that includes one or more links to one or more predicted interfaces, of the sequence of interfaces to which the user device is predicted to navigate,
the interface of the website or the program being generated using the Particular display configuration; and
provide the interface that includes the one or more links for display on the user device.

16. The non-transitory computer-readable medium of claim 15, wherein the machine learning model is trained using at least one of:
a supervised machine learning technique,
a clustering technique,
a dimensionality reduction technique,
a structured prediction technique,
an anomaly detection technique,
a technique utilizing a neural network, or
a reinforcement learning technique.

17. The non-transitory computer-readable medium of claim 15, wherein the one or more instructions, that cause the one or more processors to generate the interface of the website or the program, cause the one or more processors to:
generate the interface using the unified display configuration,
wherein the one or more links included in the interface are a plurality of links that include a first link and one or more additional links, and
wherein the first link is a link that the user device is predicted to navigate to before the one or more additional links.

18. The non-transitory computer-readable medium of claim 15, wherein the one or more instructions, that cause the one or more processors to generate the interface of the website or the program, cause the one or more processors to:
generate the interface using a first display configuration that includes the button that provides the real-time prediction of the next interface that is predicted to be visited,
wherein the one or more links included in the interface include a first link to which the user device is predicted to navigate,
wherein the button is selectable by the user device and is capable of changing the first link to a second link of the one or more links, and
wherein the second link is another link to which the user device is predicted to navigate.

19. The non-transitory computer-readable medium of claim 15, wherein the one or more instructions, when executed by the one or more processors, further cause the one or more processors to:
receive, from the user device, an indication that the user device has performed a particular interaction with the interface;
determine that the particular interaction is not an interaction with the one or more links;
predict, using the machine learning model, a new sequence of interfaces to which the user device will navigate, based on the particular interaction with the interface;
modify, based on the new sequence of interfaces predicted by the machine learning model, the interface of the website or the program to replace the one or more links with one or more additional links to one or more additional predicted interfaces, of the new sequence of interfaces, to which the user device is predicted to navigate; and
provide the interface that has been modified for display on the user device.

20. The non-transitory computer-readable medium of claim 15, wherein the one or more instructions, when executed by the one or more processors, further cause the one or more processors to:
generate, before providing the interface for display on the user device, an automation recommendation that presents the user device with a plan for automatically performing one or more interactions at scheduled time periods; and
provide the automation recommendation for display on the interface.

* * * * *